Figure 11:
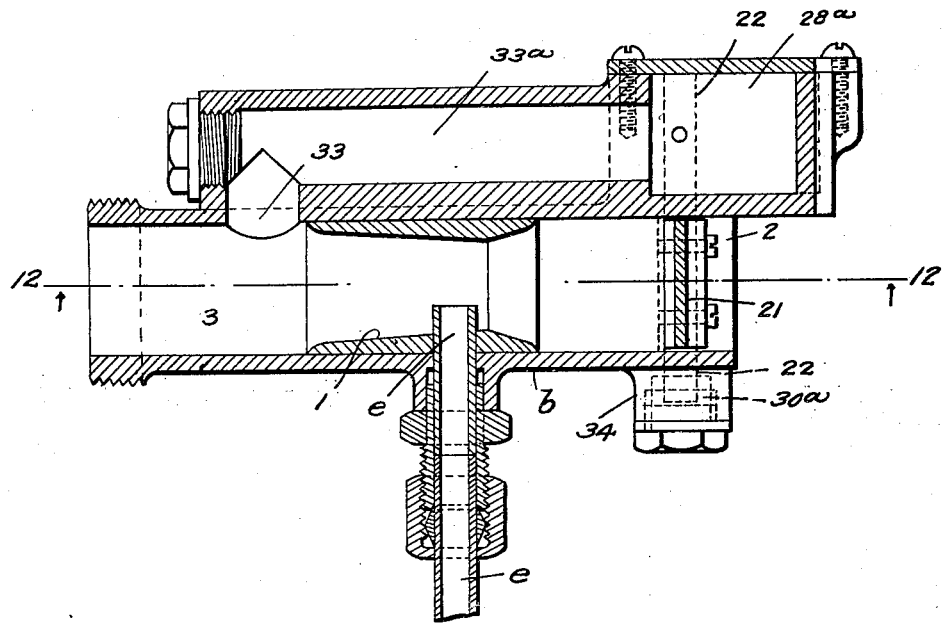

Aug. 5, 1930.  E. SEIGNOL  1,772,160
FEEDING DEVICE FOR INTERNAL COMBUSTION ENGINES
Filed Sept. 23, 1927  5 Sheets-Sheet 1
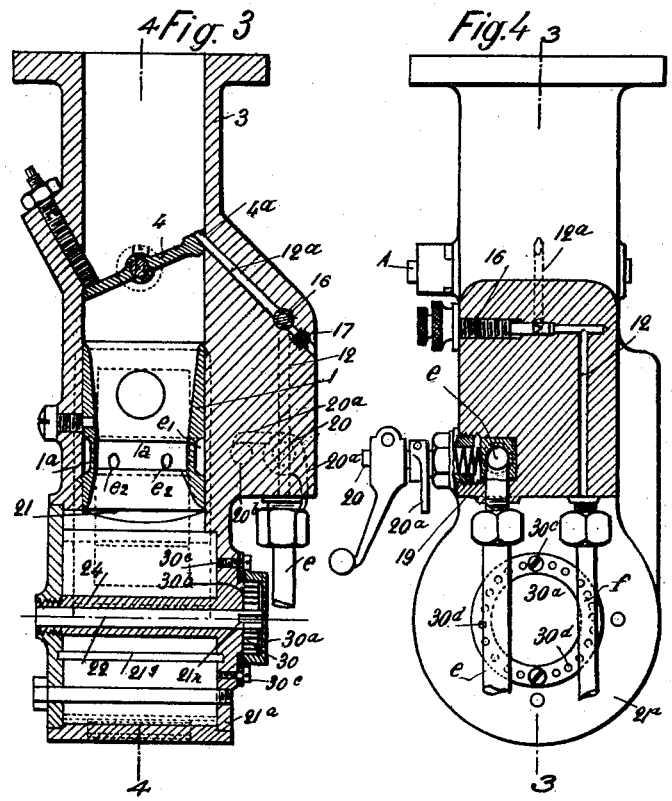
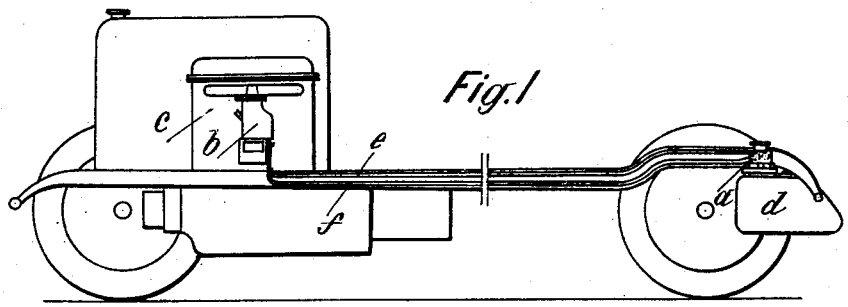

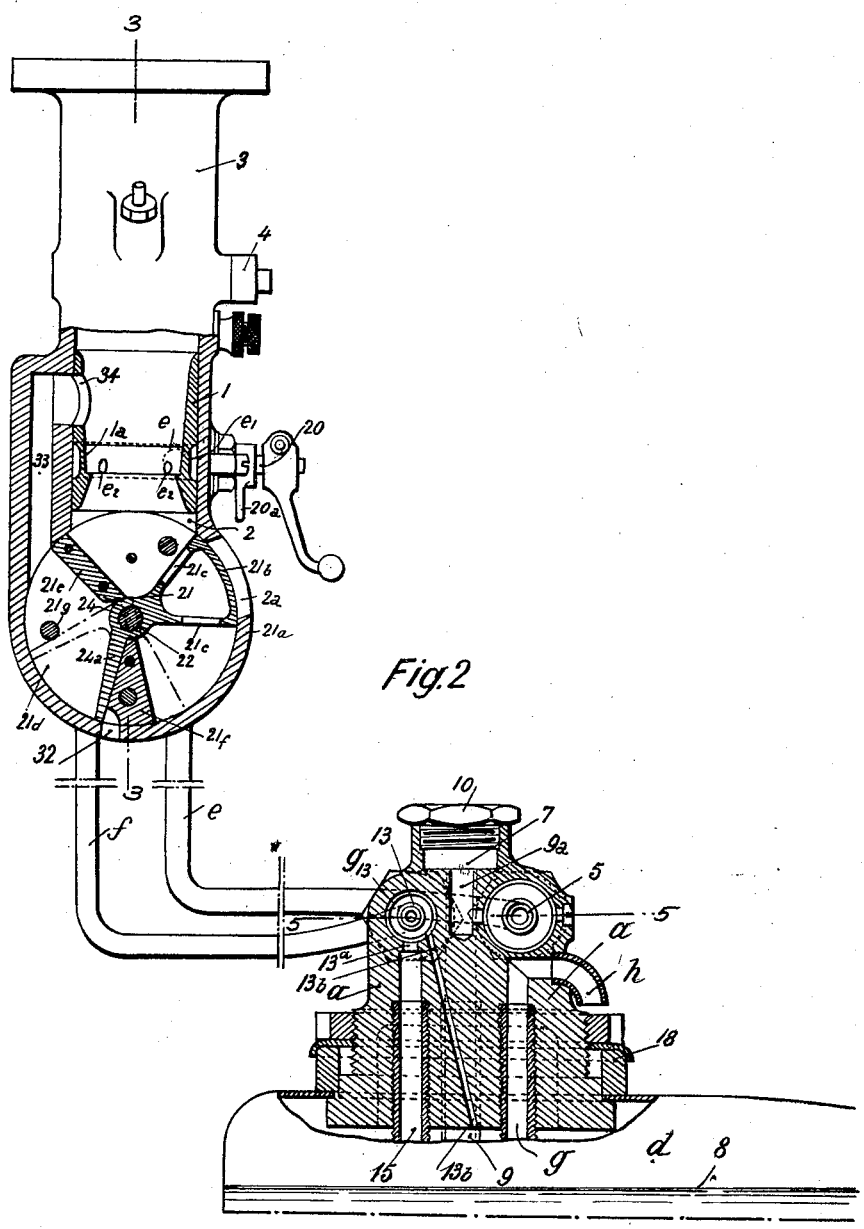

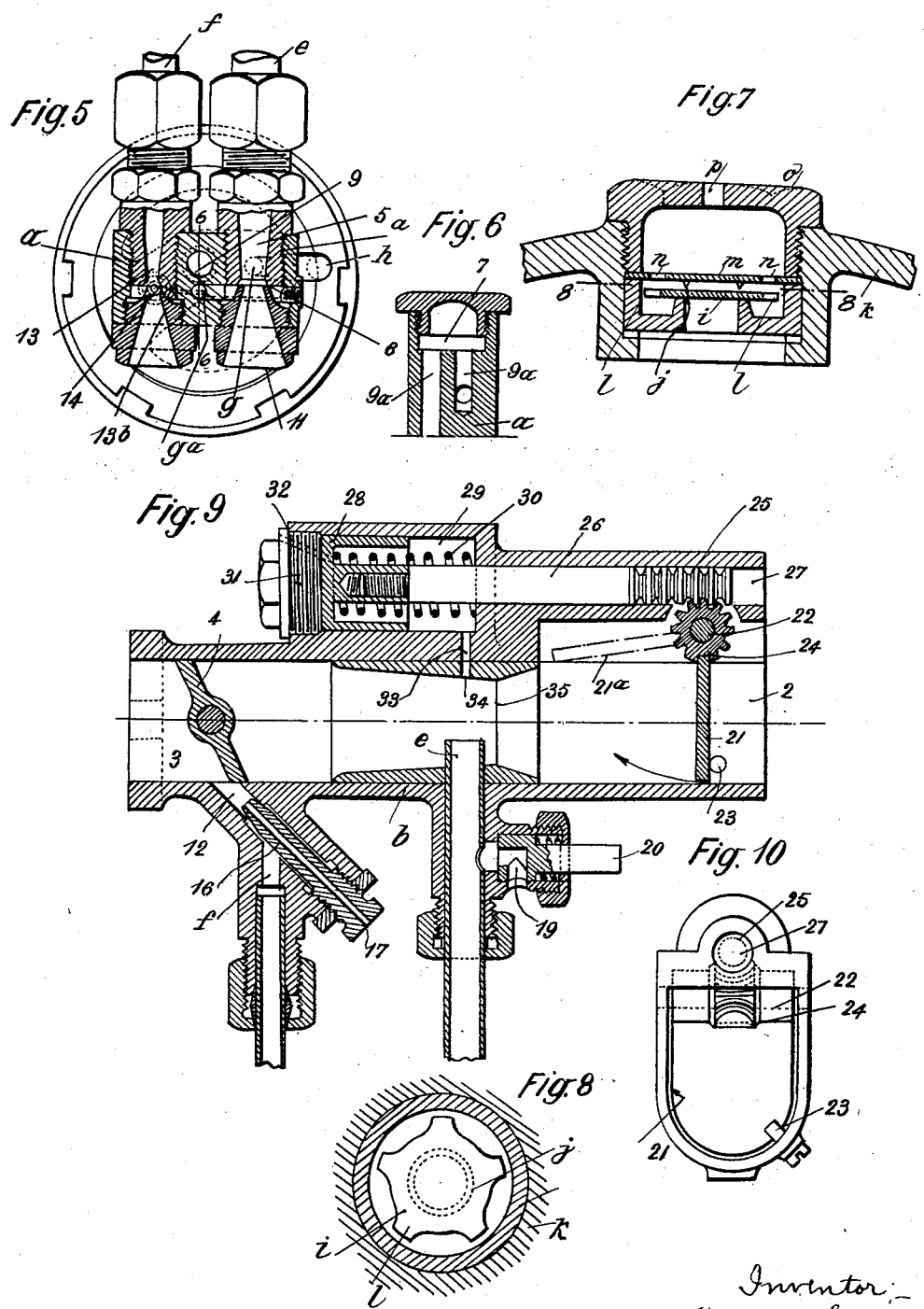

Aug. 5, 1930.  E. SEIGNOL  1,772,160

FEEDING DEVICE FOR INTERNAL COMBUSTION ENGINES

Filed Sept. 23, 1927  5 Sheets-Sheet 4

Inventor:
Edouard Seignol
By Mauro + Lewis
Attorneys.

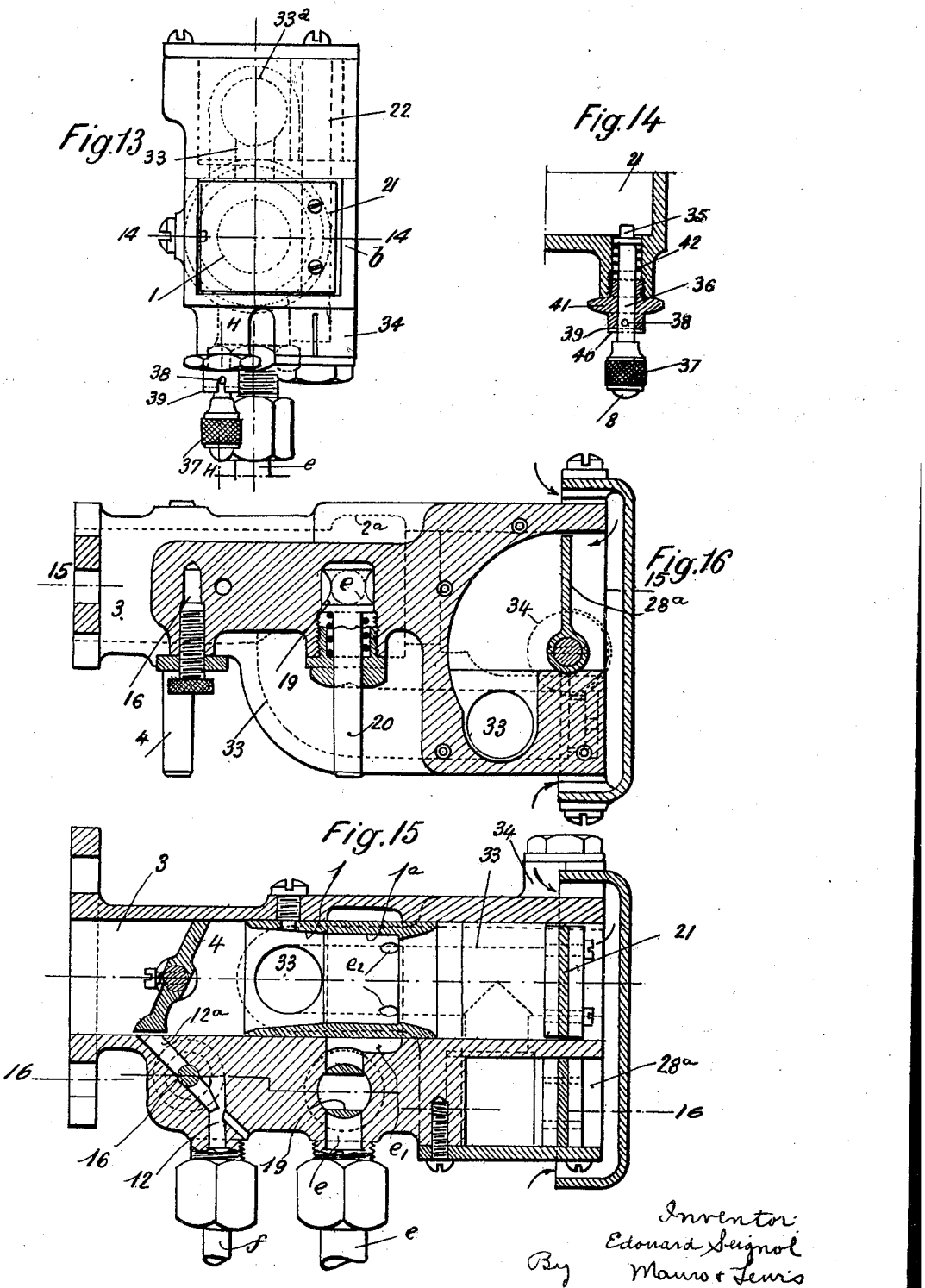

Patented Aug. 5, 1930

1,772,160

UNITED STATES PATENT OFFICE

EDOUARD SEIGNOL, OF PARIS, FRANCE

FEEDING DEVICE FOR INTERNAL-COMBUSTION ENGINES

Application filed September 23, 1927, Serial No. 221,539, and in France January 13, 1927.

A perfect feeding device for internal combustion engines should act at all times as an actual gas generator which produces independently of the momentary conditions of operation of the engine which it feeds, a quantity of gas sufficient for the needs of the latter, this gas always having the same composition.

The present invention refers to feeding devices for internal combustion engines, in which the fuel is raised by a Venturi tube to a certain height or merely to a level above the fuel reservoir, then mixes with air in the Venturi tube and is carried in its new physical state to the intake of the engine where there is provided final means for charging the mixture with air, with means for regulating the admission of air.

Such a feeding system, has the disadvantage, particularly in engines with high output, of not feeding the engine immediately and with a proper mixture principally picking up at low conditions of working when the control throttle valve is open to the full admission position.

The improvements forming the subject of the present invention provide for a feeding system of this type having a great constancy in the quality of the rich mixture formed in the neighbourhood of the reservoir and in the regulation of the carburetted mixture supplied to the engine, and this for every position of the control throttle valve and for each state or variation in state of the engine.

This feeding system comprises essentially the combination (a) of a primary carburation arrangement situated on or in the carburettor reservoir and fed by tubes dipping therein, the reservoir being arranged with a natural or artificial suction, (b) of an arrangement of piping for leading the very rich mixture formed by the primary carburation arrangement, (c) of a secondary carburation arrangement creating suction in the said pipe and provided with an automatic control member for the air actuated by the suction existing in the secondary carburation arrangement.

The two primary and secondary carburation systems do not act independently of one another, the secondary carburation arrangement confining itself to diluting the mixture produced by the primary. By the provision of a suction appreciably constant the secondary carburation device has a direct and necessary action of the operation of the primary, to assure a regularity of operation in all cases, even of low conditions of working when the throttle is fully open.

A further object is to simplify the secondary carburation arrangement which receives the mixture in proximity to the engine. This object is accomplished by the provision of an arrangement to control by means of suction existing in the carburation arrangement, the plug, gate or slide placed in the entry to this latter, and to determine its opening according to the amount of this suction in such a manner as to create in the admission pipe a suction of an appreciably constant value.

The invention comprises several subsidiary arrangements which will be described hereafter. These arrangements, as also the chief means and details forming in their combination the entire feeding device which is described below, may of course be used in other carburation systems than those referred to above.

The invention is illustrated in the accompanying drawings.

Figure 12:
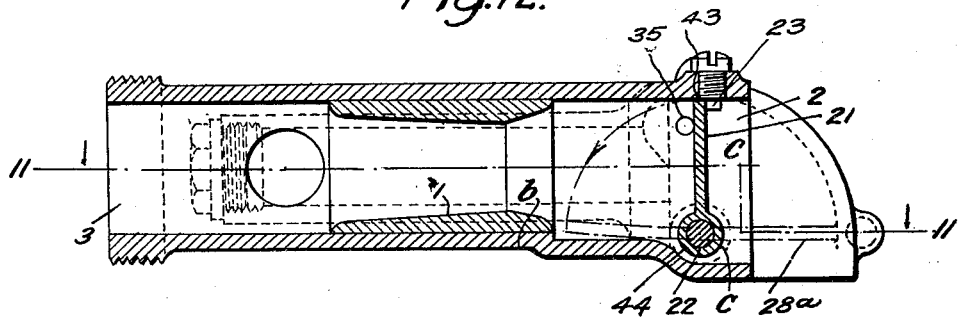

Figure 1 is a diagrammatic elevation of the whole arrangement mounted on an automobile chassis, of a feeding device constructed in accordance with the invention. Figure 2 is a longitudinal section, to a larger scale, of one form of construction of engine feeding device, provided with a number of the improvements forming the subject of the present invention. Figure 3 is a diametral section on the line 3—3 of the secondary carburation arrangement in Figure 2. Figure 4 is a similar view on the line 4—4 of Figure 3. Figure 5 is a sectional plan on the line 5—5 of the primary carburation arrangement shown in Figure 2. Figure 6 is a partial section on the line 6—6 of Figure 5. Figure 7 is a diametric section of the safety valve. Figure 8 is a section in plan on the line 8—8 of Figure 7. Figure 9 is a longitudinal section of a modification. Figure 10 is an end view of this modification in part. Figure 11 is a longitudinal section on the line 11—11 of Figure 12 of a modification of the feeding device, particularly intended for use with industrial motors. Figure 12 is a section on the line 12—12 of Figure 11. Figure 13 is an end view of the feeding device shown in Figures 11 and 12. Figure 14 is a fragmentary section of a detail on the line 14—14 of Figure 13. Figure 15 is a longitudinal section on the line 15—15 of Figure 16 of another modification. Figure 16 is a section on the line 16—16 of Figure 15.

In the various figures of the drawings, the invention is shown in its application to a feeding device raising the fuel with a reservoir situated at some distance from the engine, this device being of the type in which a rich mixture is produced in the immediate neighbourhood of the reservoir and is carried up to the engine where the rich mixture is mixed with a certain quantity of supplementary air.

As illustrated in Figures 1 and 2, the feeding device $a, b$ feeds the engine $c$ from a fuel reservoir $d$, a primary carburation arrangement $a$ being connected to a secondary carburation arrangement $b$ by pipes $e$ and $f$.

As shown in detail in Figures 2, 3 and 4, the secondary carburation arrangement comprises a diffuser Venturi tube 1, adjacent to an air inlet 2, and communicating with the intake of the motor by the tube 3 in which is the usual throttle valve 4. This valve is provided with a hole $4^a$.

In the neighbourhood of the narrow part of the diffuser 1, is a pipe $e$ which communicates with a primary Venturi tube 5 of which the narrow part 6 is in communication with a chamber 7 communicating with the carburation arrangement 8 contained in the reservoir $d$ by a tube 9 which extends to the bottom of the reservoir, and whose upper end leads into the chamber 7. This chamber 7 is air-tight and is closed hermetically by a cap 10. The inlet 11 to the Venturi tube 5 is open to the atmosphere (see Figure 5).

On the other hand, the pipe $f$ communicates with a channel 12, $12^a$ (Fig. 4) which leads into the tube 3 on the down stream side of the throttle valve 4 at the point where this valve engages the wall of the tube 3 when it is closed. At its other end the tube $f$ communicates with a second primary Venturi tube 13, of dimensions similar to the former one, and whose neck or narrowed portion 14 communicates through a calibrated hole $13^a$ with a tube 15 immersed in the carburation arrangement 8, and descending to the bottom of the reservoir. The communication between the pipe $f$ and the channel $12^a$ is controlled by a valve 16. A permanent air opening provided with a calibrated hole 17 provides a constant admission of air into the channel $12^a$ whatever be the position of the valve 16.

The whole of the primary carburation arrangement $a$ is hermetically secured by a joint 18 to the reservoir $d$.

A valve 19, (Figure 4) operable by spindle 20 provided with a tappet $20^a$, which during rotation engages with a fixed abutment $20^b$, enables the flow of rich mixture for normal running to be regulated.

The pipe $e$ leads into a chamber $e'$ which communicates through a suitable number of orifices $e^2$ with the interior of the diffuser 1 in the neighbourhood of the neck of the latter, which may be provided with an enlargement $1^a$.

The air inlet 2, near the neck of the diffuser Venturi tube 1, is provided with a gate 21, pivotally mounted on an axis 22 and capable of displacement, with or without a small amount of clearance, in a cylinder $21^a$ which communicates with the air inlet 2. This gate comprises a solid part $21^a$ and is provided with holes $21^c$. In the position shown in Figure 2, it completely, or nearly completely blocks a port $2^a$ formed in the wall of the cylinder $21^a$. When the gate 21 turns about its axis 22, it covers or uncovers the port $2^a$. The resultant effect of arranging the parts so as to bring the gate valve 21 close to the neck of the diffuser Venturi tube 1, is to maintain a relatively high air-speed even when this valve is nearly closed.

On the hub 24 of the gate is fixed a vane $24^a$ capable of movement in a chamber $21^d$ of the cylinder $21^a$. This chamber is bounded by two fixed partitions $21^e$ and $21^f$ which extend as far as the hub 24. The travel of the vane $24^a$ is limited on one side by the partition $21^f$ (in which position the slide $21^b$ blocks the port $2^a$) and on the other side by an abutment $21^g$ (in which position the slide $21^b$ entirely uncovers the port $2^a$). A spiral spring 30, the strength of which is proportioned to the surface of the vane and to the pressure which it is desired to maintain in the diffuser, is fixed at one of its ends to the axis 22 and at its other end to a box $30^a$ which, in order to regulate the tension on the spring, may be turned on the cylindrical projection $30^b$ on the cylinder $21^a$, and secured after rotation by a screw $30^c$ and holes $30^d$.

The cylinder $21^a$ is provided with an orifice 32 allowing communication from one of the sides of the vane $24^a$ with the surrounding air. A port 33 connects the other side of the vane with a point 34 in the diffuser 1 near the neck of the latter. A valve or other control device may be situated in the air inlet 32 or in the port 33 so as to brake the movements of the whole (gate and vane) with the object of preventing this device from synchronizing with the long period vibrations produced in the admission pipe during operation at high speed and low fuel admission. This occurs when the automobile is running in flat or descending country.

The apparatus acts as follows:—

The position of the throttle valve 4 shown in the figure corresponds to slow running. For this stage of operation the engine sucks through the tube 3, the hole $4^a$, the channel 12, $12^a$ and the pipe $f$ into the Venturi tube 13, thus raising the petrol by the pipe 15, and supplies to the channel 12 and to the hole $4^a$ a very rich carburetted mixture whose quantity is regulated on the one hand by the discharge from the Venturi tube 13 and by its calibrated hole $13^a$ and on the other hand by the position of the valve 16, while a certain quantity of air, admitted through 17, mixes at $12^a$ with the rich mixture coming from the pipe $f$. During this time the pressure in the diffuser 1 is zero, atmospheric pressure establishing itself in the diffuser by the clearance which exists round the gate 21, and contingently by the communication established through the Venturi pipe 5, the tube $e$, the valve 19, the chamber $e^1$, and the holes $e^2$. The spring 30 can in consequence turn the vane $24^a$ to its lowermost position against the partition $21^f$, (the full-line position shown in Figure 2) and in consequence close the air inlet $2^a$, 2.

If, in order to pass to normal operation, the throttle valve 4 is opened, the suction in the tube 3 extends into the diffuser 1 and is transmitted through the holes $e^2$, chamber $e'$ and the tube $e$ to the Venturi tube 5, which sucks the fuel by the tube 9 through the chambers 7 in which a vacuum is established. This fuel reaches the Venturi tube 5 through the descending conduit $9^a$, and enters through the neck 6 of the said Venturi tube, producing, by mixing with the indrawn air, a very rich carburetted mixture which passes into the diffuser 1. The suction is transmitted also through 33 to the vane $24^a$ which, owing to the fact that its other face is submitted to atmospheric pressure owing to the orifice 32, is displaced towards the abutment $21^g$ compressing the spring 30 and taking with it the gate $21^b$ which uncovers the port $2^a$ and allows the passage of the air, which passes through 2 to the diffuser 1 and mixes with the rich mixture which passes on from thence to the engine.

If, then, the engine can pick up its normal speed of working, the suction in the diffuser 1 will be great and the vane $24^a$ will be displaced against the action of its spring 30, as far as the extreme position shown in Figure 2, corresponding to the maximum opening of the air admission port $2^a$. If for some reason or other, for example, a great resistance to the engine, the latter turns less quickly although the throttle valve is held fully open, the pressure will decrease in the diffuser 1 and in consequence in the conduit 33, and the spring will return the vane $24^a$ with a certain lag, thus closing to some extent the air admission port $2^a$ and decreasing the quantity of air admitted to the carburation device to an extent proportional to the new conditions of running of the engine. If the engine regains its normal running the reverse operations take place and the gate 21 will return towards its position of maximum opening and the quantity of air admitted will become greater in proportion to the greater quantity of rich carburetted mixture sucked in by the pipe $e$.

The correct discharge of the fuel as indicated in Figure 2 by the Venturi tube 13 for slow running is assured either by the calibrated orifice $13^a$ or by the natural discharge of the Venturi tube which is dimensioned accordingly. The constancy of the charge of fuel by the Venturi tube is obtained by the hermetic closure of the reservoir, sealing it by means of a stopper which prevents the entry of air and by fitting a tube $g$ which descends nearly to the bottom level of the reservoir $d$ and communicates at its other end $h$ with the atmosphere. When through consumption the free level of the fuel falls in the reservoir $b$ it causes a lowering of pressure in the space above this free level and the level of the fuel will fall in the tube $g$. When this lowering of pressure is sufficiently great the atmospheric pressure will drive back the fuel in the tube $g$ and the air will penetrate to the lower end of this latter in the reservoir so as to maintain above the free level of the fuel a depression which will be constantly equal to the height of the fuel above the lower end of the tube $g$. The charge of fuel on the Venturi tubes, will, in consequence, be constantly equal to the algebraical sum of the height of the free level of the fuel above the lower end of the tube $g$ and of the height between the free level of the fuel and the Venturi tubes, a sum which is constant.

In Figure 2 is shown a channel $13^b$ which provides communication between the suction chamber of the Venturi tube 13 and the reservoir $d$. This arrangement allows, as soon as the venturi 13 commences to operate, that is to say, as soon as the motor starts, a sufficient depression in the reservoir to assure an immediate operation of the air inlet tube $g$ and to give from the start the desired charge of fuel to the Venturi tube 13. In the example given, the vacuum is maintained in the reservoir during normal running by the fact that it continues constantly to produce a certain suction through the Venturi tube 13.

In order to facilitate picking up, the Venturi tube 5 for normal running is fed through the chamber 7 in which the ascending tube 9 ends and from whence the descending conduit $9^a$ starts, which terminates in the suction chamber of the Venturi tube.

Owing to this arrangement, when the throttle valve 4 of the engine is closed, the Venturi tube 5 ceases to act and a certain quantity of fuel accumulates in the chamber of this Venturi tube. During the pick up which follows, this quantity of fuel is immediately sucked through the Venturi tube and allows time for the fuel to rise again through the tube 9 and reach the suction chamber of the said Venturi tube through the conduit 9ª without any retardation in the admission of the mixture.

Thus there is no interruption in the carburation and it is even possible to assure a momentary enrichment in the carburetted mixture at the moment of picking up.

In the case where there is no channel 13ᵇ or where the reservoir d is hermetically closed, it may happen that when the fuel has been reduced to a low temperature in consequence of the circulation outside of the automobile which carries the reservoir, and when this vehicle enters a place such as a garage having an appreciably higher temperature, a pressure may be set up above the free level of the liquid and drive the fuel out through the tubes 15 and 9 and finally through g and make it spill outside.

To avoid the establishment of this pressure while permitting a depression to develop in the interior of the reservoir to produce every useful effect, such as a regulation of the height of the charge of the Venturi tubes or the extent of the height of the fuel in the reservoir, the closing stop for the reservoir, as is indicated in Figures 7 and 8, may be provided with a safety valve, which, for example, comprises a very light metallic disc resting on a seat j separated by the plug k from the reservoir d.

This disc is provided with guiding wings l so that the spaces between them allow passage of the air contained in the reservoir when under the pressure which is established in the interior of the latter. The valve i will be raised and abut against a stop m, which is itself pierced with holes n and kept in place by a plug o provided with a hole p.

In the modification shown in Figures 9 and 10, the supply of air is produced by the combination of an obturator actuated by mechanism submitted to the depression of the carburettor and by an automatic vane, the obturator and the vane forming in this case one and the same part.

In the air inlet of the secondary carburettor b is situated a vane 21 mounted to pivot on an axle 22. This vane normally engages with an abutment 23; in this position it completely or nearly blocks the air inlet 2. When it pivots about its axis this vane may take the position shown in dotted lines at 21ª of Figure 9.

The hub 24 supporting this vane meshes with a rack 25 formed on a rod 26 capable of sliding longitudinally in a passage 27. This rod is connected to a piston 28 which can slide in a cylinder 29 and which is constantly urged to the left of the figure by a spring 30. The end of the cylinder 29 is closed by a plug 31 provided with a hole 32 establishing communication with the atmosphere. A conduit 33 establishes communication between the cylinder 29 and a point 34 situated in the diffuser and in the neighbourhood of the neck 35 of the latter.

This apparatus works as follows:—

The position of the throttle valve 4 shown in the drawing corresponds to slow running. For this period of operation the engine draws the rich carburetted mixture through the tube 3, the conduit 12 and the pipe f, while a certain amount of air mixes at 12 with the rich mixture passing through the tube f. During this time the suction is zero in the diffuser in consequence of the clearance which is provided round the vane 21 and also in consequence of the communication which is established through the tube e and the correction valve 19. The spring 30 can, thus push the piston 28 to the end of its travel towards the left, which results in maintaining the vane 21 against its stop 23 and in consequence to close the inlet 2.

If, in order to change to the normal running, the control throttle valve 4 is opened the suction pressure which exists in the tube 3 reaches the diffuser 1, which draws in the rich carburetted mixture.

If the engine can take up its normal speed of working for a considerable opening of the valve 4, the current of air which acts on the vane 21 tends to open it wider, but if the conduit 33 did not exist this passage of air would be the only means of maintaining the vane 21 open against the opposing force of the spring 30, and this opening would only be obtained by the existence of a loss of charge limiting the entry of air into the diffuser 1; the engine could not then develop the power which it should produce for the opening in question of the valve 4. It is at this point the part of the conduit 33 comes in.

The suction which exists in the diffuser 1 and which is increased by the current of air and carburetted mixture in front of the orifice 34, is transmitted to the cylinder 29 which, under the effect of the difference in pressure between the suction which exists in the cylinder 29 and the pressure of atmospheric air which penetrates through the conduit 32, compresses the spring 30 and pushes the rod 26 and rack 27 towards the right of the figure, which results in causing the hub 24 to rotate, and in consequence the vane 21, about their axis 22 so as to increase the opening offered to the passage of air. This arrangement permits, if the force of the spring 30 is suitably adjusted, completely to move the vane 21 as far as the position shown at 21ª in the drawings and in consequence to free the air inlet 2 to the carburettor entirely. The loss of charge which would have existed in the arrangement which has just been described is in consequence entirely suppressed.

If while the throttle valve 4 is wide open the engine experiences an increased resistance, which diminishes its speed of rotation to a marked degree, the quantity of carburetted mixture drawn in by it decreases, and the suction then becomes too weak in the diffuser 1 for the piston 28 to continue to compress the spring 30. The vane 21, no longer actuated by the depresison which was previously transmitted through the conduit 33 to the piston 28, closes until it takes a position of equilibrium which for a suitable force applied to begin with to the spring 30, allows the correct quantity of air to enter, so as to maintain a suitable dilution for the carburetted mixture.

It will thus be seen that the vane 21 acts partly in an automatic manner, simply against the action of a spring 30, when for a small opening of the throttle valve 4, or a low speed of running of the engine, the throttle valve 4 being fully open, the suction is small in the diffuser 1, but that, on the contrary, it acts as an obturator dependent on the suction in the diffuser 1 (static or dynamic suction), while, when the throttle valve 4 is open, the engine will take up its normal running.

It should be noted that, at certain periods of the operation of the feeding arrangement the vane 21 may operate at the same time as an automatic vane and as an obturator actuated by the depression in the diffuser.

Figures 11, 12, 13, 14 corresponding to a feeding device for an industrial motor engine are not provided with an arrangement for slow running; the obturating gate for dilution 21 is not in this case actuated by a piston, but by a vane 28ª. It will be seen that in these figures the arrangement of secondary carubrettor $b$ with its tube $e$ supplied with rich carburetted mixture is furnished with a suitable arrangement, such as for example, an arrangement similar to that shown in Figures 2–5, a diffuser 1, air inlet 2, sleeves 3 leading to the engine, and obturating control gate 21 mounted on its axis 22. But here in place of the obturating gate 21 being actuated by a piston 28 it is actuated by a vane 28ª mounted on the axis 22 of the gate 21 against the action of a spiral spring 30ª housed in the boss 34. A suction existing in the carburation arrangement is transmitted to the vane 28ª by conduits 33 and 33ª. A stop 23 limits the closed position of the gate 21.

The operation of this feeding device is the same in principle as that described in the preceding figures. When the suction is large in the tube 3 and the diffuser 1, it is transmitted not only to the gate 21 to open it but also by the conduits 33 and 33ª to the vane 28ª which through its axis 22 follows the movement of the gate 21 and forces it to open completely, so as completely to free the air inlet 2. On the contrary, when the suction is small in 1 and 3, it acts principally on the gate 21 so as to limit the entry of air into the carburation arrangement.

There is shown at 35 in Figure 12, a stop which is shown in detail in Figure 14. This stop is mounted on a rod 36 solid with a button 37. The rod 36 is provided with a pin 38, which may be positioned either in the base of a slot 39 provided in the face 40 of a projection 41, or on the face 40 of this stop 41 by turning the rod 36 through 90 degrees by means of the button 37. A spring 42 is provided to cause the stop 35 to move upwards. Before the engine is started, the slot is placed in the position shown in Figure 14 and blocks the gate 21. The engine is started on a very rich mixture which enters through the tube $a$, but by pulling back the button 37 and turning it through 90 degrees the stop 35 is moved so as to free the gate 21. As shown at 43 in Figure 12 a certain amount of clearance may be provided, and also at 44 round the gate 21 so as to provide permanently a certain admission of air into the carburation arrangement even when the slide 21 is closed.

In the modification shown in Figures 15 and 16 the same arrangement of the gate 21 is shown actuated by a vane 28ª similar to that shown in Figures 12 and 13, but here there is a carburation arrangement $f$, 12, 12ª and 16 for slow running similar to that shown in Figure 2; the arrangement for carburation for normal running $e$, 19, $e^1$, $e^2$, 1ª is also the same as shown in Figure 2.

What I do claim as my invention, and desire to secure by Letters Patent, is:

1. A feeding device for internal combustion engines which comprises the combination of a diffuser at or near the neck of which fuel is fed, a throttle between the diffuser and the engine, a gate situated in the suction passage of the diffuser at the upstream end thereof and forming part of a cylindrical surface, mounted on an axial spindle which carries a flap open at one side to the atmosphere and at the other side to the engine suction.

2. A feeding device for internal combustion engines which comprises the combination of a diffuser at or near the neck of which fuel is fed, a throttle between the diffuser and the engine, a gate situated in the suction passage of the diffuser at the upstream end thereof and forming part of a cylindrical surface, mounted on an axial spindle which carries a flap open at one side to the atmosphere and at the other side to the engine suction, and an adjustable spring tending to close said gate.

3. A feeding system for internal combustion engines which comprises the combination of a single diffuser Venturi tube, a throttle situated between the said diffuser and the engine, two Venturi tubes adapted to raise fuel from a reservoir and to mix air therewith for producing a rich mixture, connecting pipes discharging said mixture into the diffuser at two different points therein, and an air inlet valve in the suction passage at the up-stream side of the diffuser and in close proximity to the neck of the diffuser, said valve being controlled wholly by suction in the diffuser at a point intermediate said two different points only so as to open when suction occurs, the amount of opening increasing with increase of suction.

4. A feeding system for internal combustion engines which comprises the combination of a single diffuser Venturi tube, a throttle situated between the said diffuser and the engine, two Venturi tubes each adapted to raise fuel from a fuel reservoir and to mix air therewith to form a rich mixture, the first Venturi tube discharging into the diffuser in the neighborhood of the throttle and at the engine suction side of it, while the second venturi discharges in the diffuser near the neck thereof, and an air valve in the suction passage on the up-stream side of the diffuser and in close proximity to the neck of the diffuser, said valve being controlled by the suction in the diffuser.

5. A feeding system for internal combustion engines which comprises the combination of a single diffuser Venturi tube, a throttle situated between the said diffuser and the engine, two Venturi tubes each adapted to raise fuel from a fuel reservoir and to mix air therewith to form a rich mixture, the first Venturi tube discharging into the diffuser in the neighborhood of the throttle and at the engine suction side of it, while the second venturi discharges in the diffuser near the neck thereof, and an air valve in the suction passage on the up-stream side of the diffuser and in close proximity to the neck of the diffuser, said valve being controlled by the suction in the diffuser, together with a duct leading from one of the Venturi tubes to the space above the free surface of the fuel in the reservoir, and an inlet pipe open to the atmosphere and extending substantially to the bottom of the reservoir.

6. A feeding system for internal combustion engines which comprises the combination of a single diffuser Venturi tube, a throttle situated between the said diffuser and the engine, two Venturi tubes each adapted to raise fuel from a fuel reservoir and to mix air therewith to form a rich mixture, the first Venturi tube discharging into the diffuser in the neighborhood of the throttle and at the engine suction side of it, while the second venturi discharges in the diffuser near the neck thereof, and an air valve in the suction passage on the up-stream side of the diffuser and in close proximity to the neck of the diffuser, said valve being controlled by the suction in the diffuser, together with a duct leading from one of the Venturi tubes to the space above the free surface of the fuel in the reservoir, an inlet pipe open to the atmosphere and extending substantially to the bottom of the reservoir, and means for maintaining a supply of fuel at or near the neck of that one of the Venturi tubes which is adapted to feed for normal running.

7. In a fuel feeding device for internal combustion engines, the combination of a diffuser Venturi tube at or near the neck of which fuel is fed, a throttle between the diffuser and the engine, a rotary air inlet valve situated in the suction passage up-stream of the diffuser, a spindle on which the said valve is fixedly mounted for operation, and an incased flap also fixedly mounted on the spindle with one side in operative communication with a point in the diverging part of the diffuser Venturi tube for exposure to the suction produced dynamically by the passage of the fuel mixture, and the other side exposed to the atmosphere.

8. In a fuel feeding device for internal combustion engines, the combination of a diffuser Venturi tube at or near the neck of which fuel is fed, a throttle between the diffuser and the engine, a rotary air inlet valve situated in the suction passage up-stream of the diffuser, a spindle on which the said valve is fixedly mounted for operation, an increased flap also fixedly mounted on the spindle with one side in operative communication with a point in the diverging part of the diffuser Venturi tube for exposure to the suction produced dynamically by the passage of the fuel mixture, and the other side exposed to the atmosphere, and a retractile spring tending to rotate said valve into closed position and to rotate the flap against the tension of the dynamically produced suction.

In testimony whereof I have affixed my signature.

EDOUARD SEIGNOL.